(12) United States Patent
Nomaru

(10) Patent No.: US 12,121,975 B2
(45) Date of Patent: Oct. 22, 2024

(54) CUTTING MACHINE

(71) Applicant: DISCO CORPORATION, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 615 days.

(21) Appl. No.: 17/144,265

(22) Filed: Jan. 8, 2021

(65) Prior Publication Data

US 2021/0229186 A1    Jul. 29, 2021

(30) Foreign Application Priority Data

Jan. 29, 2020    (JP) ................... 2020-012713

(51) Int. Cl.
*B23B 25/06*    (2006.01)
(52) U.S. Cl.
CPC ................. *B23B 25/06* (2013.01)
(58) Field of Classification Search
CPC .... B23Q 17/2457; B23B 25/06; B28D 5/022; B28D 5/0064; B24B 49/12
USPC ............................................................. 83/72
See application file for complete search history.

(56) References Cited

U.S. PATENT DOCUMENTS

| | | | | |
|---|---|---|---|---|
| 6,533,641 B1* | 3/2003 | Morken | ................... | B24B 49/12 451/6 |
| 2001/0035535 A1* | 11/2001 | Hayashi | ................ | H01L 21/681 257/200 |
| 2002/0166552 A1* | 11/2002 | Adachi | ................ | B23D 59/001 125/13.01 |
| 2002/0186370 A1* | 12/2002 | Roesner | ................ | B24B 49/183 356/301 |
| 2015/0009321 A1* | 1/2015 | Goldstein | .......... | B23Q 17/2409 348/135 |
| 2016/0022148 A1* | 1/2016 | Schnitzer | ................. | A61B 5/24 600/478 |
| 2019/0076981 A1* | 3/2019 | Sekiya | ................ | B24B 27/0683 |

FOREIGN PATENT DOCUMENTS

| | | | | |
|---|---|---|---|---|
| CN | 1978131 A | * | 6/2007 | |
| JP | 2007042855 A | | 2/2007 | |
| JP | 2012040651 A | * | 3/2012 | |
| JP | 5172383 B2 | * | 3/2013 | ......... A61B 1/00165 |
| WO | WO-2011014687 A2 | * | 2/2011 | ......... A61B 1/00165 |

OTHER PUBLICATIONS

JP-5172383-B2, Translation (Year: 2023).*
Translation, JP 2012040651 A (Year: 2024).*
Translation CN1978131A (Year: 2024).*

* cited by examiner

*Primary Examiner* — Nhat Chieu Q Do
(74) *Attorney, Agent, or Firm* — Greer, Burns & Crain, Ltd.

(57) ABSTRACT

A cutting machine includes a monitoring unit that monitors a cutting edge of a cutting blade. The monitoring unit includes an imaging unit that images the cutting edge of the cutting blade, a pulse light source that emits a pulse light to illuminate an imaging zone imaged by the imaging unit, and a camera that captures an image outputted from the imaging unit. The imaging unit includes a first imaging unit that images one side surface of the cutting edge of the cutting blade, a second imaging unit that images an opposite side surface of the cutting edge, and a third imaging unit that images an outer peripheral edge portion of the cutting edge.

10 Claims, 6 Drawing Sheets

CUTTING MACHINE

CROSS-REFERENCE TO RELATED APPLICATIONS

This application claims priority to Japanese Patent Application No. 2020-012713 filed on Jan. 29, 2020, the entire contents of which is incorporated herein by reference.

BACKGROUND OF THE INVENTION

Field of the Invention

The present invention relates to a cutting machine including a monitoring unit for monitoring a cutting edge that cuts a workpiece held on a chuck table.

Description of the Related Art

A wafer, on a front side of which a plurality of devices such as integrated circuits (ICs) or large scale integrations (LSIs) are formed in regions defined by intersecting streets, is divided into individual device chips by a cutting machine including a cutting blade, and the device chips so divided are used in electronic equipment such as mobile phones or personal computers.

On the other hand, a cutting machine including a blade detection unit, which monitors conditions of a cutting edge formed in an annular shape on an outer periphery of a cutting blade, has been proposed by the present assignee (see JP 2007-042855A), and the use of the blade detection unit enables to find the replacement time of the cutting blade by detecting the conditions of the cutting edge of the cutting blade.

SUMMARY OF THE INVENTION

However, the technique disclosed in JP 2007-042855A is configured to arrange a light-emitting element and a camera with a cutting edge interposed therebetween and to monitor a silhouette of the cutting edge by using a light irradiated from the light-emitting element, and therefore cannot detect detailed conditions such as whether or not cutting debris has deposited on any side surface of the cutting edge or whether or not abrasive grains have fallen off from any side surface of the cutting edge. The technique disclosed in JP 2007-042855A is hence not considered to have a high accuracy of predictions as to the replacement time of a cutting blade, the conditions of cut grooves to be formed in a workpiece, the conditions of chipping, and so on, and further improvements are demanded.

The present invention therefore has as an object thereof the provision of a cutting machine that accurately detects the conditions of side surfaces of a cutting edge and is excellent in the accuracy of predictions of the replacement time of a cutting blade, the conditions of cut grooves to be formed in a workpiece, and the like.

In accordance with an aspect of the present invention, there is provided a cutting machine including a chuck table that holds a workpiece, a cutting unit including a cutting blade with a cutting edge disposed in an annular shape to cut the workpiece held on the chuck table, a monitoring unit that monitors the cutting edge of the cutting blade, and a monitor. The monitoring unit includes an imaging unit that images the cutting edge of the cutting blade, a pulse light source that emits a pulse light to illuminate an imaging zone imaged by the imaging unit, and a camera that captures an image outputted from the imaging unit. The imaging unit includes a first imaging unit that images one side surface of the cutting edge of the cutting blade, and a second imaging unit that images an opposite side surface of the cutting edge. The first imaging unit includes a first prism having one face opposite the one side surface of the cutting edge, a first imaging lens arranged on an opposite face of the first prism, and a first optical fiber connected at one end face thereof to the first imaging lens to transmit a first image. The second imaging unit includes a second prism having one face opposite the opposite side surface of the cutting edge, a second imaging lens arranged on an opposite face of the second prism, and a second optical fiber connected at one end face thereof to the second imaging lens to transmit a second image. The first image outputted from an opposite end face of the first optical fiber and the second image outputted from an opposite end face of the second optical fiber are transmitted to the camera and are then displayed on the monitor.

Preferably, the imaging unit may further include a third imaging unit. The third imaging unit may include a third imaging lens opposite an outer peripheral edge portion of the cutting edge, and a third optical fiber connected at one end face thereof to the third imaging lens to transmit a third image, and the third image outputted from an opposite end face of the third optical fiber may be transmitted together with the first image and the second image to the camera and may then be displayed together with the first image and the second image on the monitor.

Preferably, the monitoring unit may further include a beam splitter arranged between the imaging unit and the camera, and the pulse light emitted from the pulse light source may be introduced from the opposite end faces of the respective optical fibers arranged in the imaging unit via the beam splitter, and may be guided to the one end faces opposing a to-be-imaged region of the cutting edge of the cutting blade, whereby the to-be-imaged region of the cutting edge is illuminated.

Preferably, the monitoring unit may further include an illuminating optical fiber optically connected at an end thereof to the pulse light source to transmit the pulse light, whereby the imaging zone is illuminated by the illuminating optical fiber.

Preferably, the cutting machine may further include a control unit having a storage section that stores an image of the cutting edge of the cutting blade as captured by the monitoring unit.

Preferably, the pulse light source may be configured to emit the pulse light at a repetition frequency that satisfies the following formula:

$$\text{Repetition frequency} = X \times Y \ [\text{Hz}]$$

where X represents the number of imaging operations on the cutting edge of the cutting blade by the monitoring unit while the cutting edge makes one rotation, and Y represents the number of rotations per second of a spindle that rotates the cutting blade.

Preferably, the monitoring unit may further include a light-emitting element and a light-receiving element arranged with the cutting edge of the cutting blade interposed therebetween, and a rotary encoder arranged on a spindle that rotates the cutting blade. The pulse light source may be controlled by the control unit so that, when a quantity of light received by the light-receiving element changes, the pulse light is emitted from the pulse light source at a timing corresponding to a value detected by the rotary encoder and a region of the cutting edge, the region corresponding to the changed quantity of received light, is illuminated as a region to be imaged by the imaging unit, and is imaged by the imaging unit.

According to the present invention, it is possible to detect conditions such as whether or not cutting debris has deposited on any side surface of the cutting edge or whether or not abrasive grains have fallen off from any side surface of the cutting edge, thereby improving the accuracy of predictions as to the replacement time of a cutting blade and the conditions of cut grooves. Further, the arrangement of the third imaging unit opposite the outer peripheral edge portion of the cutting edge also enables to monitor the status of the outer peripheral edge portion of the cutting edge, so that the accuracy of predictions is further improved when the replacement time of the cutting blade, the conditions of cut grooves, the conditions of chipping, and the like are comprehended.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
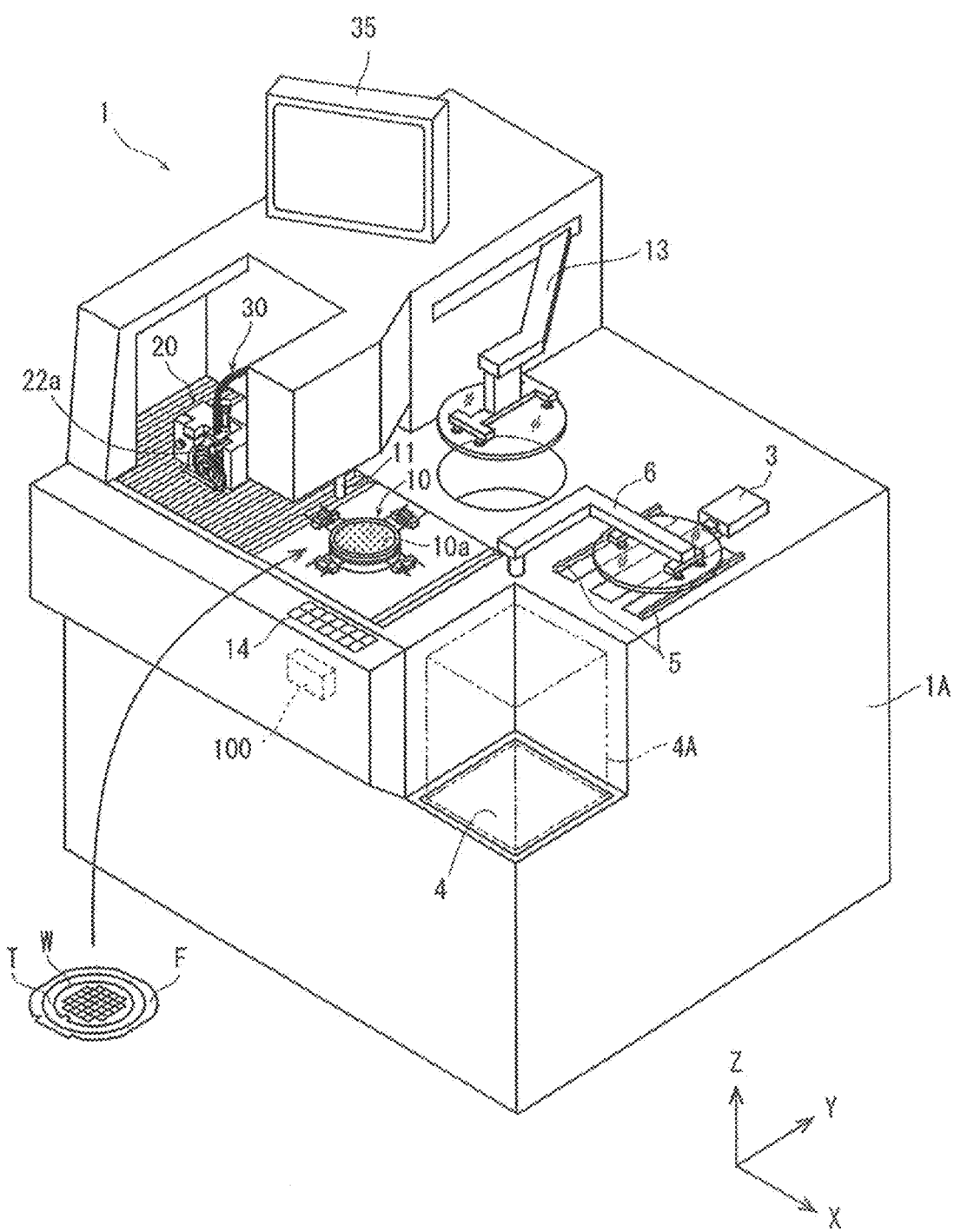
FIG. 1 is an overall perspective view of a cutting machine according to an embodiment of the present invention.

With reference to the attached drawings, a description will be made in detail regarding a cutting machine according to an embodiment of the present invention. As depicted in FIG. 1, a workpiece which is to be machined by a cutting machine 1 depicted in FIG. 1 is, for example, a wafer W of a semiconductor material held on an annular frame F via a dicing tape T. The cutting machine 1 includes a substantially parallelepipedal housing 1A, a cassette 4A removably mounted on a cassette mount region 4 in the housing 1A, a loading/unloading mechanism 3 that unloads the wafer W as the workpiece from the cassette 4A to a temporary placing table 5, a holding unit 10 that holds the wafer W, a transfer mechanism 6 having a rotary arm that transfers and mounts the wafer W, which has been unloaded to the temporary placing table 5, onto a chuck table 10a of the holding unit 10, an imaging unit 11 that images the wafer W mounted and held on the chuck table 10a, a cutting unit 20 that applies cutting machining to the wafer W, a transfer mechanism 13 that transfers the wafer W, to which the cutting machining has been applied, from the chuck table 10a to a rinsing position, a monitor 35 that displays a variety of information, and an operation panel 14 through which an operator sets machining conditions and the like.

Further, the housing 1A of the cutting machine 1 includes thereinside an undepicted moving mechanism that moves the holding unit 10 in a direction indicted by an arrow X in the figure, another undepicted moving mechanism that moves the cutting unit 20 in a direction indicated by an arrow Y and in a direction indicated by an arrow Z, and a control unit 100 indicated by dashed lines. The control unit 100 controls the loading/unloading mechanism 3, the transfer mechanism 6, the holding unit 10, the cutting unit 20, the moving mechanisms, and the like.

Figure 2A:
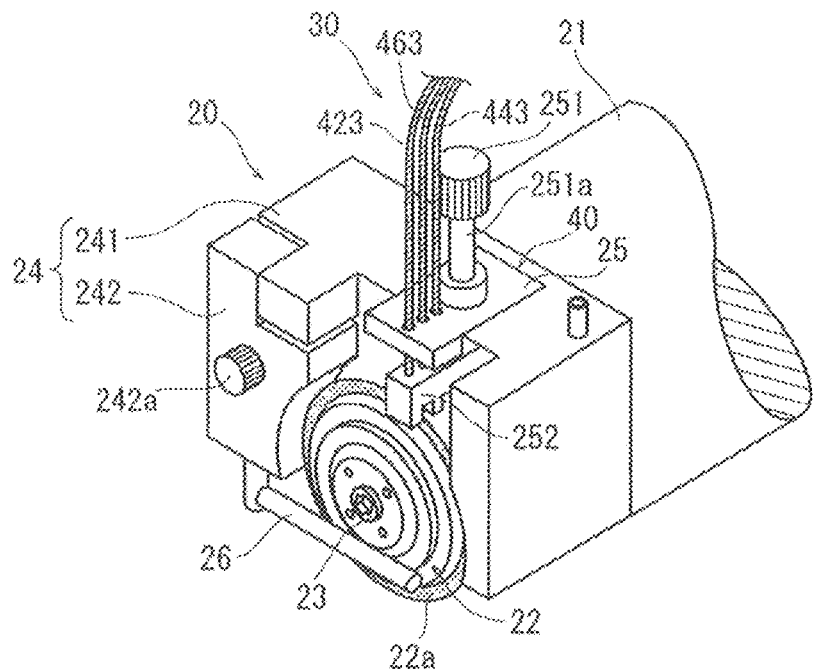
FIG. 2A is a perspective view depicting a part of a cutting unit on an enlarged scale.
Figure 2B:
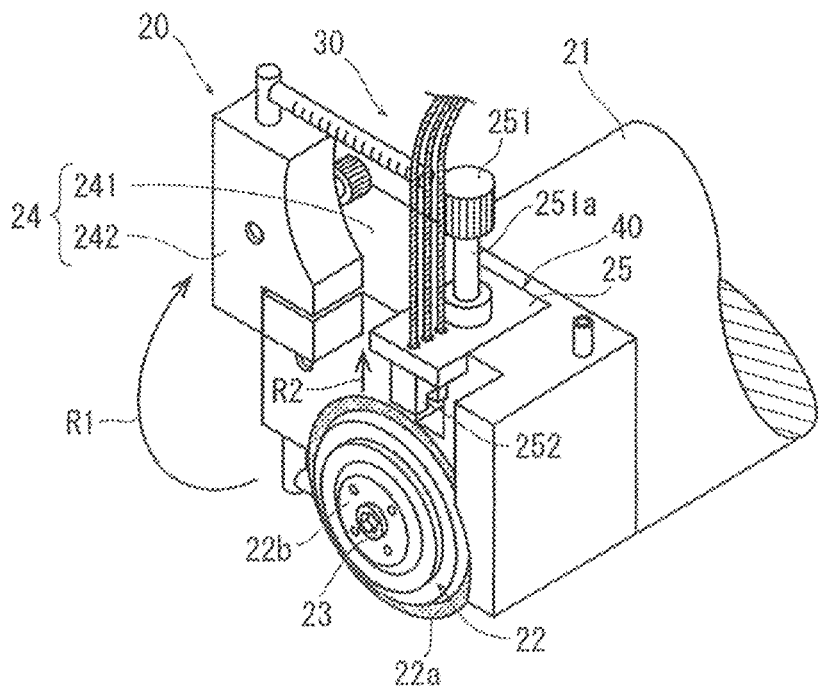
FIG. 2B is a perspective view depicting the cutting unit of FIG. 2A with a movable portion of a blade cover having been raised.

In addition to the above-described known elements, the cutting machine 1 also includes a monitoring unit 30 that monitors a cutting edge 22a of a cutting blade 22 (see FIGS. 2A and 2B). A part of the monitoring unit 30 in the present embodiment is disposed integrally with the cutting unit 20. A part of the cutting unit 20 is depicted on an enlarged scale in FIGS. 2A and 2B. As depicted in FIG. 2A, the cutting unit 20 includes a housing 21 that rotatably supports a spindle 23 on a distal end portion of which the cutting blade 22 with the cutting edge 22a included therein is fixed, a blade cover 24 that covers the cutting blade 22 at a distal end of the housing 21, and a cutting water supply pipe 26 that supplies cutting water to a machining site on the wafer W where the wafer W is cut by the cutting blade 22. On the blade cover 24, an imaging unit holding block 25 is fitted. The imaging unit holding block 25 holds a part of an imaging unit 40, which configures the monitoring unit 30 to be described subsequently herein. The spindle 23 is rotated by an undepicted electric motor. The blade cover 24 is configured of a main portion 241 fixed on the distal end of the housing 21, and a movable portion 242 swingably supported relative to the main portion 241. In a case of replacing the cutting blade 22, a fixing screw 242a that fixedly secured the movable portion 242 is loosened, the movable portion 242 is raised in a direction indicated by an arrow R1 to expose the cutting blade 22 as depicted in FIG. 2B, and a fixing ring 22b that fixedly secured the cutting blade 22 at a distal end of the spindle 23 is detached to replace the cutting blade 22.

Referring back to FIG. 1 and continuing the description, the wafer W unloaded from the cassette 4A by the loading/unloading mechanism 3 is transferred by the transfer mechanism 6 onto the chuck table 10a of the holding unit 10, where the wafer W is mounted and held under suction. The wafer W held on the chuck table 10a is imaged by the imaging unit 11 to detect a machining site (a desired street), the machining site is positioned below the cutting unit 20, and cutting machining is applied based on position information regarding the desired street detected by the imaging unit 11. After the cutting machining has been sequentially applied along all the streets, the wafer W is transferred by the transfer mechanism 13 to a rinsing position, is subjected to rinsing and drying processing, and is then returned to a predetermined position in the cassette 4A by the transfer mechanism 6 and the loading/unloading mechanism 3.

Figure 3:
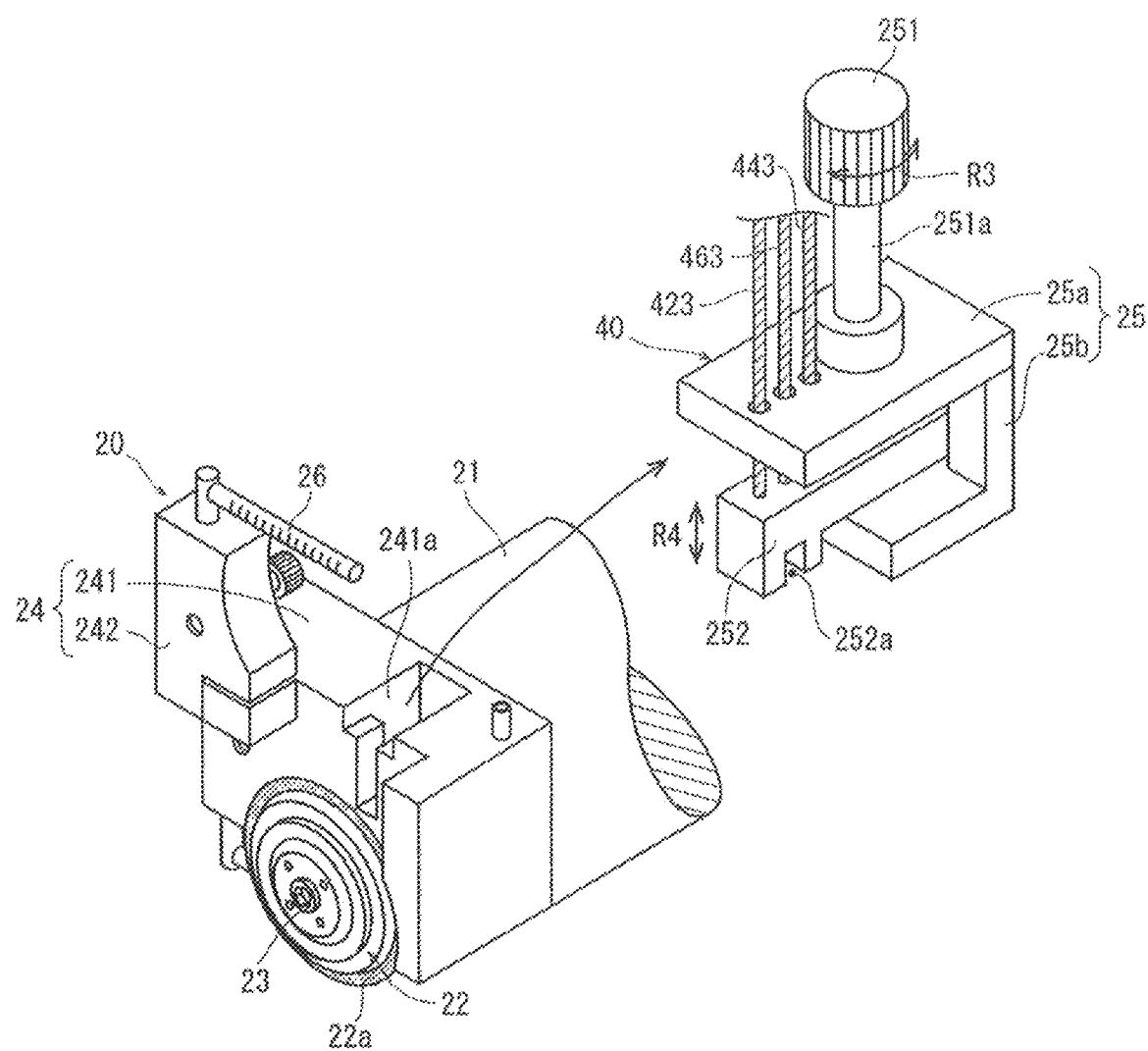
FIG. 3 is a perspective view depicting an imaging unit holding block taken out of a blade housing depicted in FIG. 2B.

FIG. 3 depicts the imaging unit holding block 25 detached from the blade cover 24 of the cutting unit 20. As depicted in the figure, the imaging unit holding block 25 includes an upper member 25a and a lower member 25b, which hold an up-and-down member 252 from above and below. The up-and-down member 252 is in threaded engagement with a rotating shaft 251a, and can be raised and lowered in directions indicated by an arrow R4 by turning an up/down knob 251 in directions indicated by an arrow R3. In a distal end portion of the up-and-down member 252, a detection space 252a is formed in a substantially inverted U-shape. When the conditions of the cutting edge 22a is imaged, the cutting edge 22a is positioned in the detection space 252a.

Figure 4:
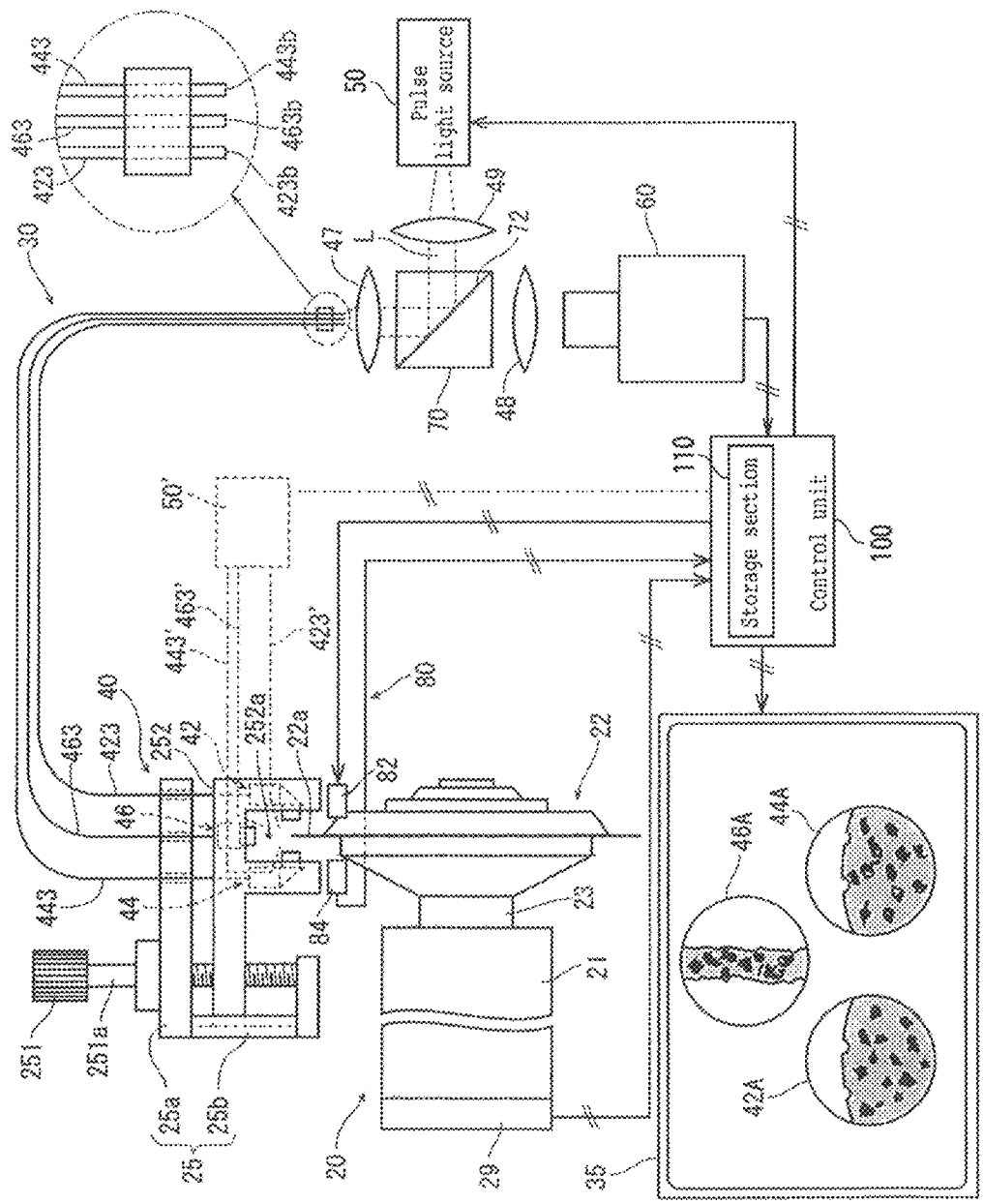
FIG. 4 is a concept diagram illustrating a configuration of a monitoring unit arranged in the cutting machine of FIG. 1.
Figure 5:
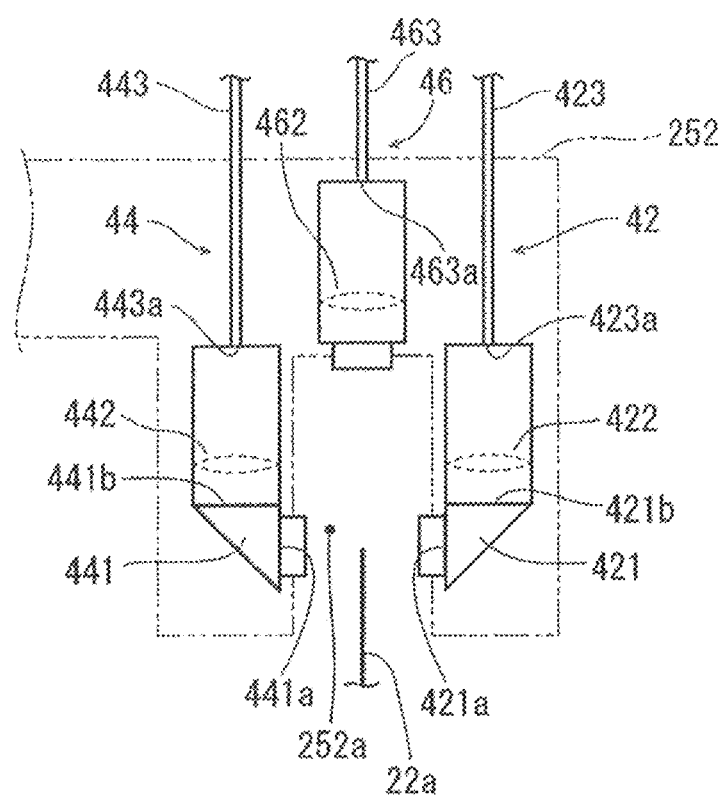
FIG. 5 is a concept diagram illustrating configurations of a first imaging unit, a second imaging unit, and a third imaging unit of the monitoring unit illustrated in FIG. 4.

With reference to FIGS. 4 and 5, a further description will be made regarding the monitoring unit 30 in the present embodiment. As illustrated in FIG. 4, the monitoring unit 30 includes the imaging unit 40 that images the cutting edge 22a of the cutting blade 22 of the cutting unit 20 (for convenience of description, the blade cover 24 has been omitted), a pulse light source 50 that emits a pulse light L to illuminate an imaging zone by the imaging unit 40, and a camera 60 that captures an image outputted from the imaging unit 40.

The imaging unit 40 includes a first imaging unit 42, a second imaging unit 44, and a third imaging unit 46, all of which are accommodated in the distal end portion of the up-and-down member 252. FIG. 5 more specifically illustrates the first imaging unit 42, the second imaging unit 44, and the third imaging unit 46. The first imaging unit 42 includes a first prism 421 having one face 421a opposite one side surface of the cutting edge 22a when the cutting edge 22a is positioned in the detection space 252a of the up-and-down member 252, a first imaging lens 422 arranged on an opposite face 421b of the first prism 421, and a first optical fiber 423 connected at one end face 423a thereof to the first imaging lens 422 to transmit an image of the one side surface of the cutting edge 22a.

The second imaging unit 44 includes a second prism 441 having one face 441a opposite an opposite side surface of the cutting edge 22a when the cutting edge 22a is positioned in the detection space 252a of the up-and-down member 252, a second imaging lens 422 arranged on an opposite face 441b of the second prism 441, and a second optical fiber 443 connected at one end face 443a thereof to the second imaging lens 442 to transmit an image of the opposite side surface of the cutting edge 22a. Therefore, the one face 421a of the first prism 421 and the one face 441a of the second prism 441 are arranged at positions that oppose each other with the detection space 252a interposed therebetween.

The third imaging unit 46 includes a third imaging lens 462 opposing an outer peripheral edge portion of the cutting edge 22a when the cutting edge 22a is positioned in the detection space 252a of the up-and-down member 252, and a third optical fiber 463 connected at one end face 463a thereof to the third imaging lens 462 to transmit an image of the outer peripheral edge portion of the cutting edge 22a. In the present embodiment, the first imaging unit 42, the second imaging unit 44, and the third imaging unit 46 are arranged in the cutting machine 1. However, the present invention is not limited to such a configuration and can be configured to arrange only the first imaging unit 42 and the second imaging unit 44 without arrangement of the third imaging unit 46.

Referring back to FIG. 4 and continuing the description, an opposite end face 423b of the first optical fiber 423, an opposite end face 443b of the second optical fiber 443, and an opposite end face 463b of the third optical fiber 463 are put together and are arranged at a position opposite a collimate lens 47. Further, the images outputted from the opposite end faces of the respective optical fibers are parallelized through the collimate lens 47 and are captured by the camera 60 positioned with a beam splitter 70 and an imaging lens 48 interposed between the collimate lens 47 and the camera 60. The images captured by the camera 60 are stored in a storage section 110 arranged in the control unit 100 and are displayed on the monitor 35. As described above, the opposite end face 423b of the first optical fiber 423, the opposite end face 443b of the second optical fiber 443 and the opposite end face 463b of the third optical fiber 463 are put together, and therefore the images (42A, 44A, and 46A) outputted from the respective opposite end faces are concurrently captured by the camera 60. The images 42A, 44A, and 46A are hence put together in a single image as illustrated in FIG. 4.

In the present embodiment, the pulse light source 50 is arranged to irradiate the pulse light L to a reflection surface 72 of the beam splitter 70 via a condenser lens 49. As the pulse light source 50, a white light source, a speckle-reduced laser diode (LD) light source, or the like can be adopted, for example. The pulse light L irradiated from the pulse light source 50 is reflected on the reflection surface 72 of the beam splitter 70, is introduced from the opposite end face 423b of the first optical fiber 423, the opposite end face 443b of the second optical fiber 443, and the opposite end face 463b of the third optical fiber 463, and is irradiated from the one end face 423a of the first optical fiber 423, the one end face 443a of the second optical fiber 443, and the one end face 463a of the third optical fiber 463 to illuminate a region, which is to be imaged and may hereinafter be also referred to as "the to-be-imaged region", on the cutting edge 22a positioned in the detection space 252a. The pulse light source 50 is connected to the control unit 100, and a timing, at which the pulse light L is to be emitted, and a repetition frequency of the pulse light L are controlled by the control unit 100.

In the embodiment described above, the pulse light L emitted by the pulse light source 50 is configured to be guided to the to-be-imaged region of the cutting edge 22a of the cutting blade 22 via the beam splitter 70 arranged between the imaging unit 40 and the camera 60 and then via the first optical fiber 423, the second optical fiber 443, and the third optical fiber 463, which configure the imaging unit 40. However, the present invention is not limited to such a configuration. As indicated by dashed lines in FIG. 4, for example, a pulse light L emitted from a pulse light source 50A may be introduced into the detection space 252a via illuminating optical fibers 423A, 443A, and 463A arranged in addition to the respective optical fibers of the imaging unit 40 and may be allowed to illuminate the to-be-imaged region of the cutting edge 22a of the cutting blade 22. If this is the case, it is unnecessary to include the beam splitter 70.

As illustrated in FIG. 4, a rotary encoder 29 is included on a proximal end portion of the cutting unit 20 to output a value (electrical signal) which indicates an angular position of the spindle 23. The value outputted by the rotary encoder 29 is transmitted to the control unit 100, so that the position, rotational speed and the like of the spindle 23 are calculated.

Figure 6:
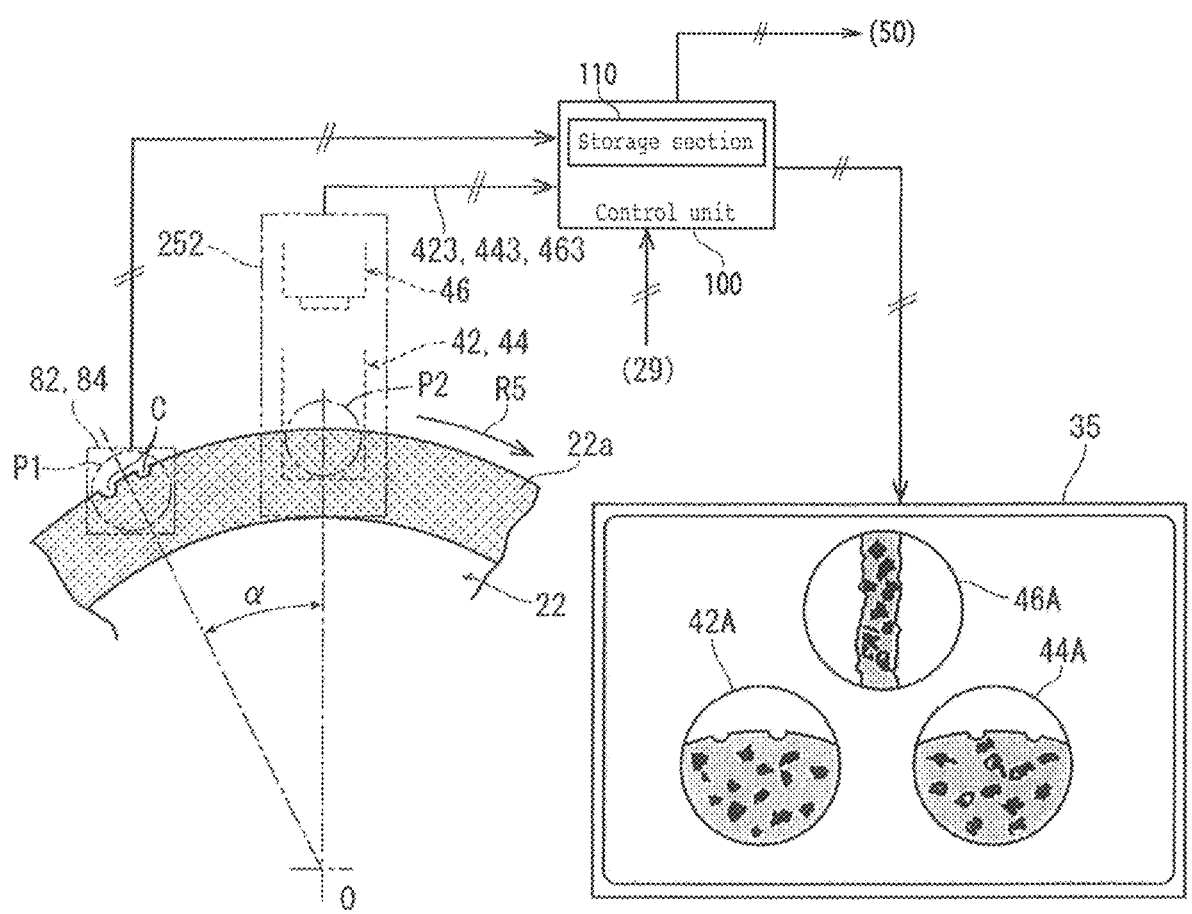
FIG. 6 is a concept diagram for describing functions of a light-emitting element and a light-receiving element illustrated in FIG. 4.

The cutting machine 1 of the present embodiment also includes a light-emitting element 82 and a light-receiving element 84 which, as illustrated in FIG. 6, are arranged on an upstream side of the up-and-down member 252 in a rotating direction (indicated by an arrow R5) of the cutting blade 22 with the outer peripheral edge portion of the cutting edge 22a of the cutting blade 22 interposed between the light-emitting element 82 and the light-receiving element 84 (also see FIG. 4). In a region P1 to be detected by the light-emitting element 82 and the light-receiving element 84, the cutting edge 22a blocks approximately ⅔ or so of a light emitted from the light-emitting element 82, a quantity of the remaining ⅓ or so of the light is received by the light-receiving element 84, and an electrical signal that indicates the quantity of the received light is transmitted to the control unit 100. As illustrated in FIG. 6, there is an angle of a' in the rotating direction between a position where the light-emitting element 82 and the light-receiving element 84 are arranged and a position where the first imaging unit 42, the second imaging unit 44, and the third imaging unit 46 are arranged.

The cutting machine 1 of the present embodiment generally has the configuration as described above. A description will hereinafter be made regarding procedures and operations when the conditions of the cutting edge 22a of the cutting blade 22 are monitored using the monitoring unit 30.

In order to monitor the conditions of the cutting edge 22a of the cutting blade 22 by the imaging unit 40 that configures the monitoring unit 30, the up/down knob 251 of the imaging unit holding block 25 is turned to lower the up-and-down member 252 so that as illustrated in FIGS. 4 and 5, the cutting edge 22a of the cutting blade 22 is positioned in the detection space 252a of the up-and-down member 252. Here, the outer peripheral edge portion of the cutting edge 22a can be positioned at a desired position in the imaging zone by the imaging unit 40 by operating the pulse light source 50 and adjusting the position of the up-and-down member 252 while watching the monitor 35.

The cutting unit 20 is then operated to rotate the cutting blade 22. The rotational speed of the spindle 23 for the cutting blade 22 is, for example, 18,000 rpm. Now, assuming that the conditions of an outer periphery of the cutting edge 22a of the cutting blade 22 are imaged at intervals of 1 degree as viewed in the rotating direction of the cutting blade 22, the number (X) of imaging operations while the cutting blade 22 makes one rotation is 360 times. Since the number (Y) of rotations per second is 18,000 [rpm]/60 [sec] (Y=18,000 [rpm]/60 [sec]), the repetition frequency upon emission of the pulse light L from the pulse light source 50 is as will be described hereinafter. Now, an assumption is made that the pulse width of the pulse light L at this time is set at a pulse width of a time interval shorter than a time required for one rotation of the spindle 23, for example, at $\frac{1}{1,000,000}$ [sec]=1 μsec.

Repetition frequency of pulse light source=360 [times]×18,000 [rpm]/60 [sec]=108,000 [Hz]

By causing the pulse light source 50 to emit the pulse light L like a flash light at the above-described repetition frequency, images are captured by the imaging unit 40 and are then stored in the storage section 110 of the control unit 100. Then, referring to 360 images stored while allowing the cutting blade 22 to make one rotation, a check is made for the conditions of the one side surface (the first image 42A), the opposite side surface (the second image 44A), and the outer peripheral edge portion (the third image 46A) of the cutting edge 22a of the cutting blade 22 as recorded in the respective images. The first image 42A and the second image 44A each have a width covering an area broader than a width over which the cutting edge 22a moves when rotating over 1 degree, so that the entire peripheral region of the cutting edge 22a can be checked based on the above-described 360 images.

According to the monitoring unit 30 in the present embodiment, the images of the one side surface, the opposite side surface, and the outer peripheral edge portion can be captured with the camera 60 for checking their conditions by irradiating the pulse light over the entire periphery of the cutting edge 22a instead of simply observing a silhouette of the outer peripheral edge portion by a light-emitting element and a camera. It is therefore possible to check not only the silhouette of the outer periphery of the cutting edge 22a but also the conditions of the one side surface and the opposite side surface of the cutting edge 22a of the cutting blade 22, for example, whether or not cutting debris has deposited to such an extent as to need a maintenance, whether or not abrasive grains have fallen off from any side face to such an extent as to need a replacement, and so on. Owing to the additional inclusion of the third imaging unit 46, it is also possible to check the conditions of wearing in the thickness direction of the outer peripheral edge portion of the cutting edge 22a. Therefore, the accuracy of predictions is further improved when the replacement time of the cutting blade 22, the conditions of cut grooves, the conditions of chipping, and so on are comprehended.

In the present embodiment, the light-emitting element 82 and the light-receiving element 84 are included in addition to the imaging unit 40, so that the conditions of the cutting edge 22a of the cutting blade 22 can be monitored by operating the pulse light source 50 at a repetition frequency different from the above-described repetition period (108,000 Hz).

As described above, there is the angle of a' in the rotating direction between the position where the light-emitting element 82 and the light-receiving element 84 are arranged and the position where the first imaging unit 42, the second imaging unit 44, and the third imaging unit 46 are arranged (see FIG. 6). Now, assume that a light emitted from the light-emitting element 82 is received at the light-receiving element 84 while rotating the spindle 23 of the cutting blade 22 at the rotational speed of 18,000 rpm. If there is no chip in the outer periphery of the cutting edge 22a, substantially no change is observed in the quantity of the light received at the light-receiving element 84. If as illustrated in FIG. 6, there are chips C in the cutting edge 22a in the region P1 where the quantity of the light received at the light-receiving element 84 from the light-emitting element 82 is to be determined, on the other hand, the quantity of the received light instantaneously changes (increases). If the control unit 100 detects this change in the quantity of the received light based on a change in a signal from the light-receiving element 84, the angular position of the spindle 23 of the cutting unit 20 at the detected timing is detected by the rotary encoder 29. The pulse light source 50 is then operated at a timing corresponding to the value (electrical signal) detected by the rotary encoder 29, in other words, at a time so that the region P1, where the quantity of the received light as detected by the light-receiving element 84 has abruptly changed, is positioned in a region P2 to be imaged by the imaging unit 40, and the pulse light L is illuminated to the to-be-imaged region to image the cutting edge 22a. The first image 42A, the second image 44A, and the third image 46A acquired by the imaging unit 40 are then transmitted to the control unit 100, stored in the storage section 110 of the control unit 100, and displayed on the monitor 35.

As described above, the region P1 where the quantity of the light received at the light-receiving element 84 abruptly changes is a region where there is a high probability of damage to the cutting edge 22a of the cutting blade 22. Therefore, when determining whether or not the replacement of the cutting blade 22 is needed, the cutting machine 1 of the present embodiment can efficiently check a region where the possibility of damage is high. Here, the repletion frequency of the emission of the pulse light L is 18,000 [rpm]/60 [sec]=300 [Hz].

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A cutting machine comprising:
a chuck table configured to support a workpiece;
a cutting unit including a cutting blade with a cutting edge disposed in an annular shape to cut the workpiece on the chuck table;
a monitoring unit that monitors the cutting edge of the cutting blade; and
a monitor,
wherein the monitoring unit includes an imaging unit assembly that images the cutting edge of the cutting blade, a pulse light source that emits a pulse light to illuminate an imaging zone imaged by the imaging unit assembly, and a camera that captures an image outputted from the imaging unit assembly,
the imaging unit assembly includes a moving member configured to move the imaging unit vertically relative to cutting blade, and a first imaging unit that images a first side surface of the cutting edge of the cutting blade, and a second imaging unit that images an opposite, second side surface of the cutting edge,
the first imaging unit includes a first prism having a face opposite the first side surface of the cutting edge, a first imaging lens arranged on an opposite face of the first prism, and a first optical fiber having a first end and an opposite second end, the first end of the first optical fiber being connected to the first imaging lens to transmit a first image,
the second imaging unit includes a second prism having a face opposite the second side surface of the cutting edge, a second imaging lens arranged on an opposite face of the second prism, and a second optical fiber having a first end and an opposite, second end, the first end of the second optical fiber being connected the second imaging lens to transmit a second image,
a light-emitting element spaced from the imaging unit assembly in a rotating direction of the cutting blade and facing the first side surface of the cutting edge, wherein the light-emitting element emits light toward the cutting edge of the cutting blade; and
a light receiving element spaced from the imaging unit assembly in the rotating direction of the cutting blade and facing the second side surface of the cutting edge, wherein the light receiving element receives at least a portion of the light emitted by the light-emitting element,
wherein the first image outputted from the second end of the first optical fiber and the second image outputted from the second end of the second optical fiber are transmitted to the camera and are then displayed on the monitor.

2. The cutting machine according to claim 1,
wherein the imaging unit further includes a third imaging unit, and
the third imaging unit includes a third imaging lens opposite an outer peripheral edge portion of the cutting edge, and a third optical fiber including a first end and an opposite second end, the first end of the third optical fiber being connected to the third imaging lens to transmit a third image, and the third image outputted from the second end of the third optical fiber being transmitted together with the first image and the second image to the camera and is then displayed together with the first image and the second image on the monitor.

3. The cutting machine according to claim 1 wherein the monitoring unit further includes a beam splitter arranged between the imaging unit and the camera, and the pulse light emitted from the pulse light source is introduced from the opposite ends of the respective optical fibers arranged in the imaging unit via the beam splitter, and is guided to the end faces opposing a to-be-imaged region of the cutting edge of the cutting blade, thereby the to-be-imaged region of the cutting edge is illuminated.

4. The cutting machine according to claim 1, wherein the monitoring unit further includes an illuminating optical fiber optically having an end connected to the pulse light source to transmit the pulse light, thereby the imaging zone is illuminated by the illuminating optical fiber.

5. The cutting machine according to claim 1, further comprising:
a control unit having a storage section that stores an image of the cutting edge of the cutting blade as captured by the monitoring unit.

6. The cutting machine according to claim 5, wherein the light-emitting element and the light-receiving element are arranged with the cutting edge of the cutting blade interposed therebetween, and a rotary encoder arranged on a spindle that rotates the cutting blade, and
the pulse light source is controlled by the control unit so that, when a quantity of light received by the light-receiving element changes, the pulse light is emitted from the pulse light source at a timing corresponding to a value detected by the rotary encoder and a region of the cutting edge, the region corresponding to the changed quantity of received light, is illuminated as a region to be imaged by the imaging unit, and is imaged by the imaging unit.

7. The cutting machine according to claim 1, wherein the pulse light source is configured to emit the pulse light at a repetition frequency that satisfies the following formula:

$$\text{Repetition frequency} = X \times Y \text{ [Hz]}$$

where X represents the number of imaging operations on the cutting edge of the cutting blade by the monitoring unit while the cutting edge makes one rotation, and Y represents the number of rotations per second of a spindle that rotates the cutting blade.

8. The cutting machine according to claim 1, wherein the imaging unit includes a holding block with an upper member and a lower member, the moving member being positioned between the upper member and the lower member and movably connected to the holding block.

9. The cutting machine according to claim 8, wherein the holding block includes a knob movably connected to the moving member, the knob configured to adjust the position of the moving member relative to the holding block.

10. The cutting machine according to claim 1, wherein an angle $\alpha$ is defined between a position of a light-emitting element and a light receiving element and a position of the imaging unit assembly.

* * * * *